United States Patent
Takahashi

(10) Patent No.: US 10,047,858 B2
(45) Date of Patent: Aug. 14, 2018

(54) CONTROL DEVICE FOR CONTINUOUSLY VARIABLE TRANSMISSION

(71) Applicant: SUBARU CORPORATION, Tokyo (JP)

(72) Inventor: Yoshitaka Takahashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 10 days.

(21) Appl. No.: 15/483,947

(22) Filed: Apr. 10, 2017

(65) Prior Publication Data

US 2017/0307076 A1 Oct. 26, 2017

(30) Foreign Application Priority Data

Apr. 20, 2016 (JP) .................................. 2016-084614

(51) Int. Cl.
*F16H 61/662* (2006.01)
*F16H 59/20* (2006.01)

(52) U.S. Cl.
CPC ........... *F16H 61/662* (2013.01); *F16H 59/20* (2013.01); *F16H 2061/66204* (2013.01)

(58) Field of Classification Search
CPC ............. F16H 61/662; F16H 61/66231; F16H 2061/66204; F16H 59/20
See application file for complete search history.

(56) References Cited

U.S. PATENT DOCUMENTS

| 2008/0305926 A1* | 12/2008 | Asaoka | F16H 61/16 477/44 |
| 2014/0214288 A1* | 7/2014 | Tokura | F16H 61/0213 701/52 |
| 2015/0152962 A1* | 6/2015 | Ajimoto | F16H 61/66259 477/37 |
| 2015/0183437 A1* | 7/2015 | Minamisawa | B60W 10/04 701/54 |

FOREIGN PATENT DOCUMENTS

JP 2011-106615 A 6/2011

* cited by examiner

*Primary Examiner* — Huan Le
(74) *Attorney, Agent, or Firm* — McGinn IP Law Group, PLLC

(57) ABSTRACT

A control device for a continuously variable transmission performs kick-down control for executing downshift if kick-down conditions are satisfied. The device includes an upshift determining unit, an upshift controller, a second-time kick-down determining unit, a second-time kick-down controller, and a second-time kick-down upshift conditions setting unit. The upshift determining unit determines whether upshift conditions are satisfied during kick-down control. The upshift controller sets an upshift amount and executes upshift if the upshift conditions are satisfied. The second-time kick-down determining unit determines whether second-time kick-down conditions are satisfied during kick-down control. The second-time kick-down controller sets a second-time kick-down downshift amount and executes downshift if the second-time kick-down conditions are sat- (Continued)

isfied. The second-time kick-down upshift conditions setting unit sets second-time kick-down upshift conditions if the second-time kick-down conditions are satisfied. If the second-time kick-down conditions are satisfied, the upshift determining unit performs determination using the second-time kick-down upshift conditions.

13 Claims, 9 Drawing Sheets

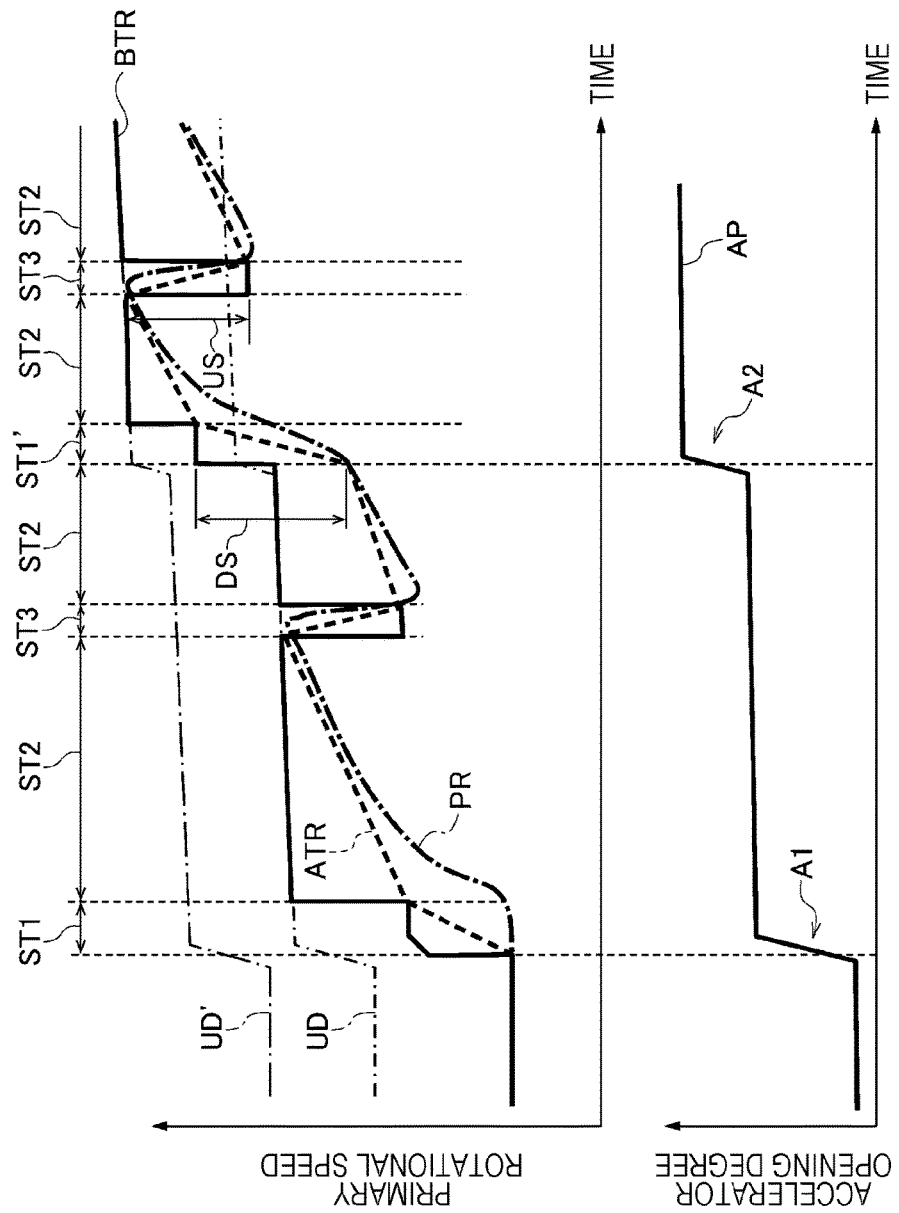

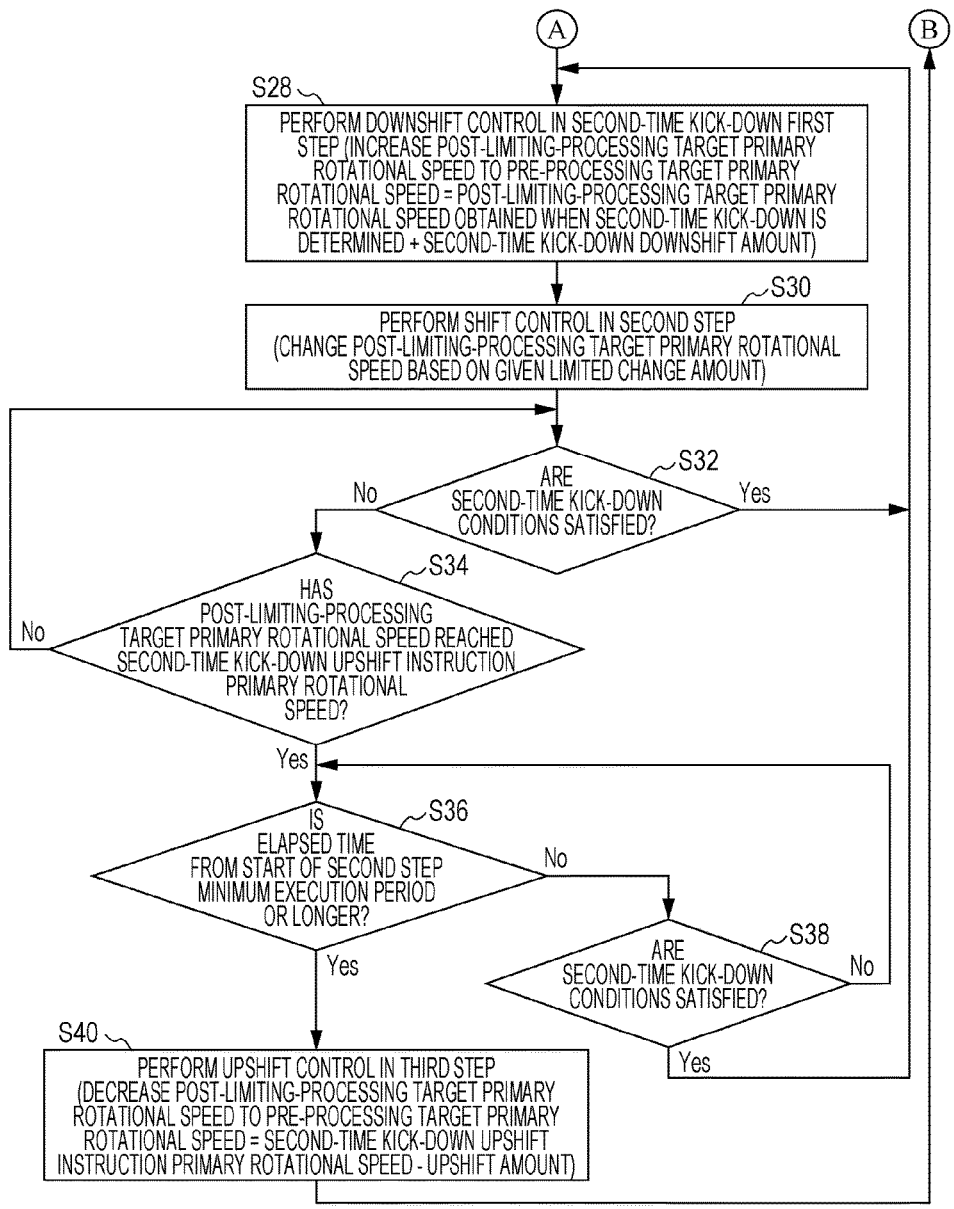

CONTROL DEVICE FOR CONTINUOUSLY VARIABLE TRANSMISSION

CROSS REFERENCES TO RELATED APPLICATIONS

The present invention contains subject matter related to Japanese Patent Application No. 2016-084614 filed in the Japan Patent Office on Apr. 20, 2016, the entire contents of which are incorporated herein by reference.

BACKGROUND

1. Technical Field

The present invention relates to a control device for a continuously variable transmission that performs kick-down control.

2. Related Art

In recent years, continuously variable transmissions (CVTs) that can change gear ratios steplessly without shift shocks have been widely used as automatic transmissions for vehicles. A continuously variable transmission includes a primary pulley provided on an input shaft, a secondary pulley provided on an output shaft, and a power transmitting element such as a chain running between these pulleys and changes the gear ratio steplessly by changing the pitch radius of the power transmitting element by changing the groove width of each pulley.

A control device that controls the continuously variable transmission controls the gear ratio in accordance with the vehicle driving state such as the accelerator opening degree and the vehicle velocity. In the control of the gear ratio, for example, the target rotational speed of the primary pulley (hereinafter referred to as "primary rotational speed") is set in accordance with the driving state, and control is performed in such a manner that the actual primary rotational speed becomes equal to the target primary rotational speed.

In addition, if kick-down conditions are satisfied, the control device for the continuously variable transmission performs control for executing downshift to a low-gear gear ratio. This control is referred to as "kick-down control" below.

Some control devices for continuously variable transmissions such as manual transmissions and automatic transmissions perform control in such a manner that gear ratios are changed in a multistage (stepwise) manner. This control is referred to as "multistage-like control" below. Japanese Unexamined Patent Application Publication No. 2011-106615, for example, discloses that, upon switching to a multistage shift mode, shift control is performed in such a manner that a plurality of fixed gear ratios that are set in a stepwise manner are switched, and upshift and downshift are executed between the fixed gear ratios.

In addition, some control devices for continuously variable transmissions perform multistage-like control during kick-down control. In this control, downshift and upshift are repeatedly executed during acceleration caused by kick-down, and the gear ratio changes in a multistage manner. This control is referred to as "multistage-like kickdown control" below.

Furthermore, if second-time kick-down conditions are satisfied during kick-down control, in order to accelerate in response to a driver's intention of performing further acceleration (operation of further depressing the accelerator pedal) during kick-down control, some control devices for continuously variable transmissions set a downshift amount and perform control for executing downshift by adding the downshift amount. This control is referred to as "second-time kick-down control" below.

In second-time kick-down control, as described above, the downshift amount is increased by a predetermined amount. Accordingly, if second-time kick-down control is combined with multistage-like kick-down control, for example, in some cases, immediately after downshift has been executed under second-time kick-down control, upshift conditions may be satisfied, and upshift may be executed under multistage-like kick-down control. In those cases, acceleration caused by second-time kick-down is terminated due to upshift, and accordingly, acceleration is not maintained against the driver's intention, resulting in acceleration failure. At the same time, the feeling of acceleration produced by the engine sound is reduced as a result of reduction in the engine rotational speed. Accordingly, it is not possible to achieve acceleration intended by the driver who has performed a second-time kick-down operation, making the driver feel strange (feel uncomfortable because the vehicle does not run as intended).

SUMMARY OF THE INVENTION

The present invention has been made to solve the above problems. It is desirable to provide a control device for a continuously variable transmission that can improve the feeling of acceleration by realizing acceleration intended by a driver even if second-time kick-down control and multistage-like kick-down control are performed during kick-down control.

A controller for a continuously variable transmission according to an example of the present invention is a control device for a continuously variable transmission configured to perform kick-down control for executing downshift in which a gear ratio of the continuously variable transmission is changed to a low-gear gear ratio if kick-down conditions are satisfied, including an upshift determining unit configured to determine whether upshift conditions are satisfied during the kick-down control; an upshift controller configured to set an upshift amount and to execute upshift by the upshift amount if the upshift determining unit determines that the upshift conditions are satisfied; a second-time kick-down determining unit configured to determine whether second-time kick-down conditions are satisfied during the kick-down control; a second-time kick-down controller configured to set a second-time kick-down downshift amount and to execute downshift by the second-time kick-down downshift amount if the second-time kick-down determining unit determines that the second-time kick-down conditions are satisfied; and a second-time kick-down upshift conditions setting unit configured to set second-time kick-down upshift conditions for starting upshift from a gear ratio that is a lower-gear gear ratio than that for normal upshift conditions that are normally used during the kick-down control if the second-time kick-down determining unit determines that the second-time kick-down conditions are satisfied. If the second-time kick-down determining unit determines that the second-time kick-down conditions are satisfied, the upshift determining unit performs determination using the second-time kick-down upshift conditions set by the second-time kick-down upshift conditions setting unit instead of the normal upshift conditions.

In the controller for a continuously variable transmission according to the example of the present invention, it is preferable that the normal upshift conditions be such that a primary pulley rotational speed is higher than or equal to a normal upshift instruction primary pulley rotational speed, and that the second-time kick-down upshift conditions be such that the primary pulley rotational speed is higher than or equal to a second-time kick-down upshift instruction primary pulley rotational speed that is higher than the normal upshift instruction primary pulley rotational speed.

In the controller for a continuously variable transmission according to the example of the present invention, it is preferable that the normal upshift instruction primary pulley rotational speed and the second-time kick-down upshift instruction primary pulley rotational speed be set in accordance with a vehicle velocity and an accelerator opening degree.

In the controller for a continuously variable transmission according to the example of the present invention, it is preferable that, if the second-time kick-down determining unit determines that the second-time kick-down conditions are satisfied, the upshift determining unit perform determination using the second-time kick-down upshift conditions until the kick-down control is completed.

BRIEF DESCRIPTION OF THE DRAWINGS

FIG. 2A illustrates an exemplary temporal change in primary rotational speed, and FIG. 2B illustrates an exemplary temporal change in an accelerator opening degree;

FIG. 4A illustrates an exemplary temporal change in the primary rotational speed, and FIG. 4B illustrates an exemplary temporal change in the accelerator opening degree;

FIGS. 5A and 5B illustrate a case where second-time kick-down upshift conditions are used after second-time kick-down, FIG. 5A illustrates an exemplary temporal change in the primary rotational speed, and FIG. 5B illustrates an exemplary temporal change in the accelerator opening degree;

FIG. 6A illustrates an exemplary temporal change in the primary rotational speed, and FIG. 6B illustrates an exemplary temporal change in the accelerator opening degree;

FIG. 7A illustrates an exemplary temporal change in the primary rotational speed, and FIG. 7B illustrates an exemplary temporal change in the accelerator opening degree;

FIG. 9 is a flowchart illustrating the flow of kick-down control (when second-time kick-down is performed) according to the example.

DETAILED DESCRIPTION

Figure 1:
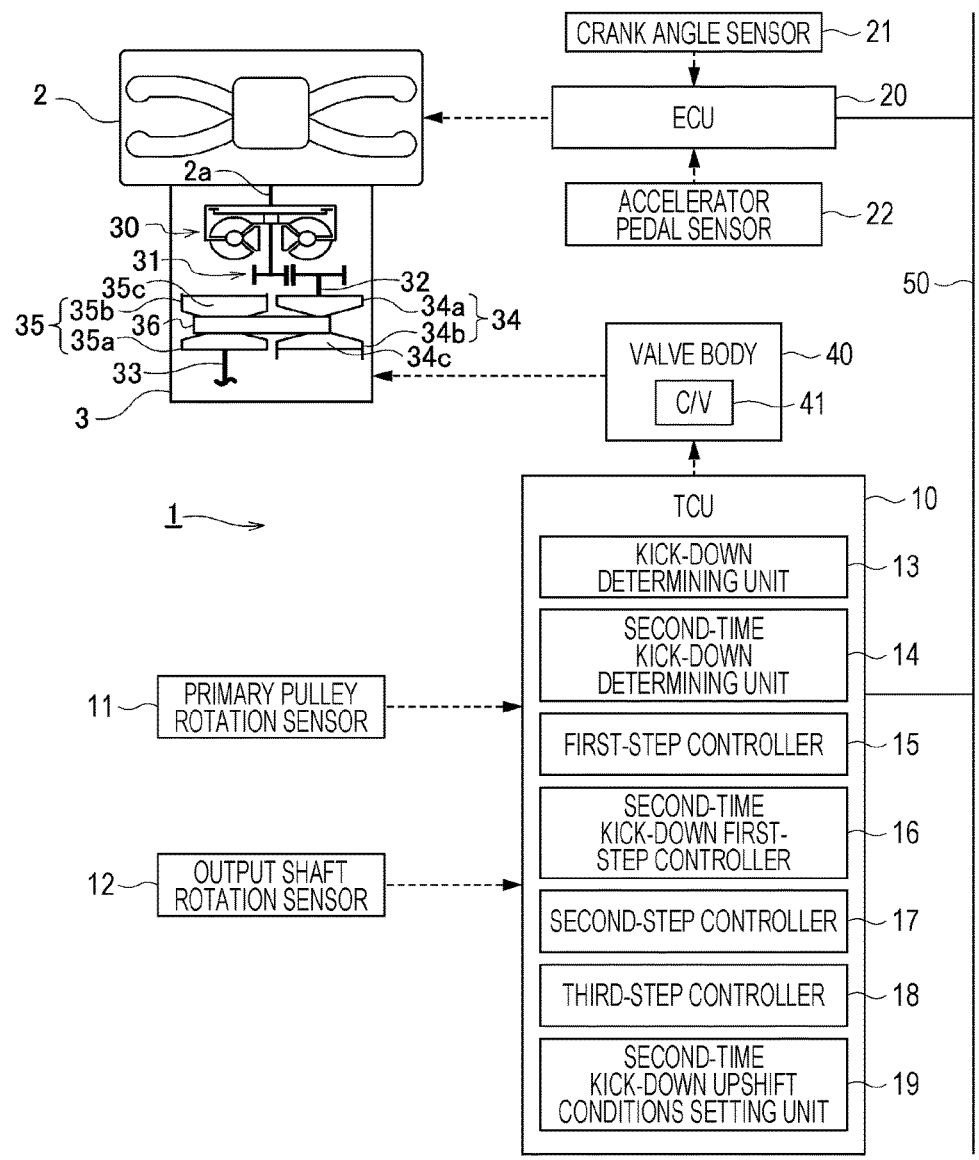
FIG. 1 is a block diagram illustrating the configuration of a control device for a continuously variable transmission according to an example.

Now, a preferred example of the present invention will be described below in detail with reference to the drawings. Note that the same or corresponding parts in the drawings are denoted by the same reference numerals. In addition, the same elements are denoted by the same reference numerals in the drawings, and repeated description is omitted.

Figure 2:
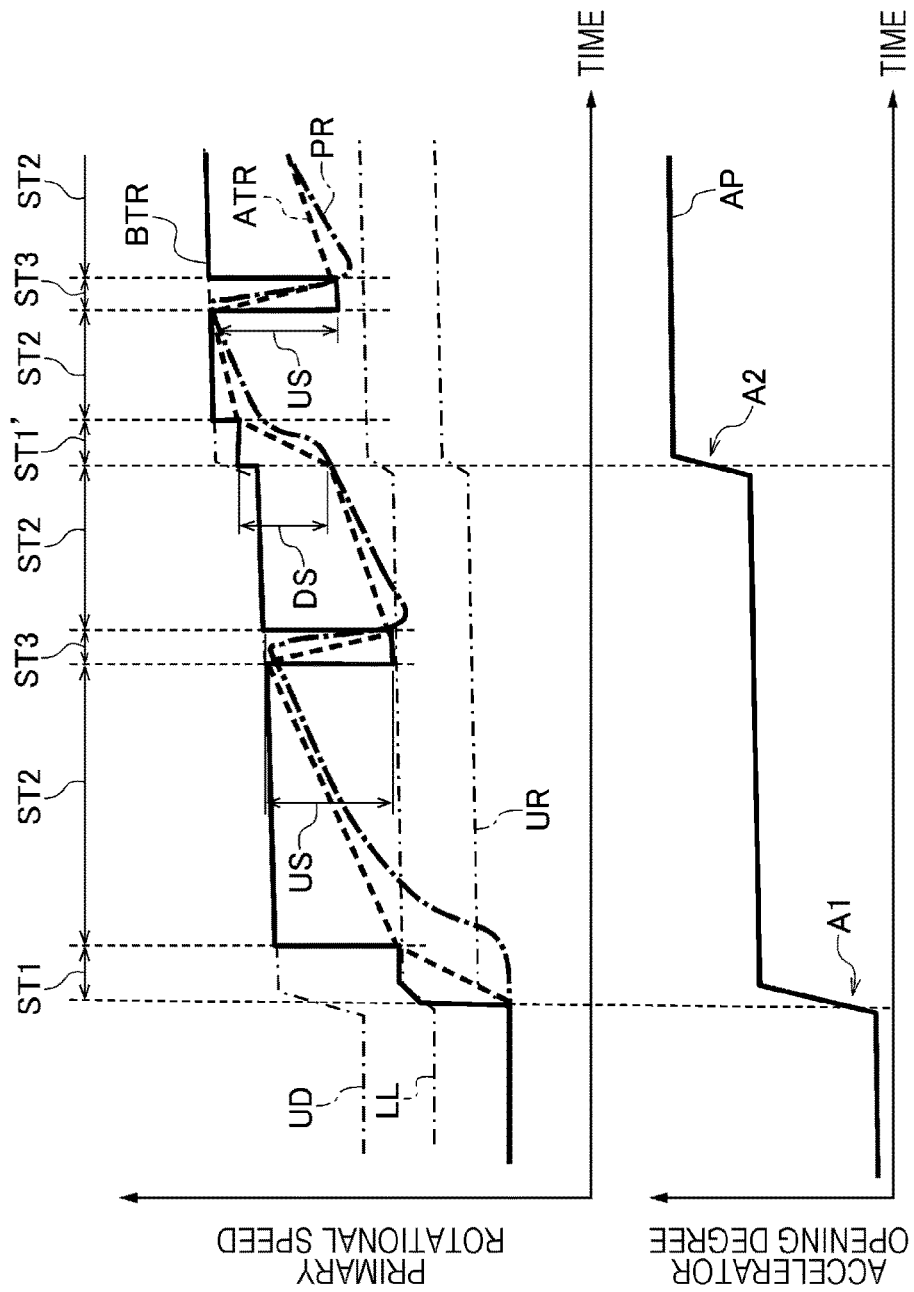
FIGS. 2A and 2B illustrate kick-down control performed by the control device for a continuously variable transmission according to the example.
Figure 3:
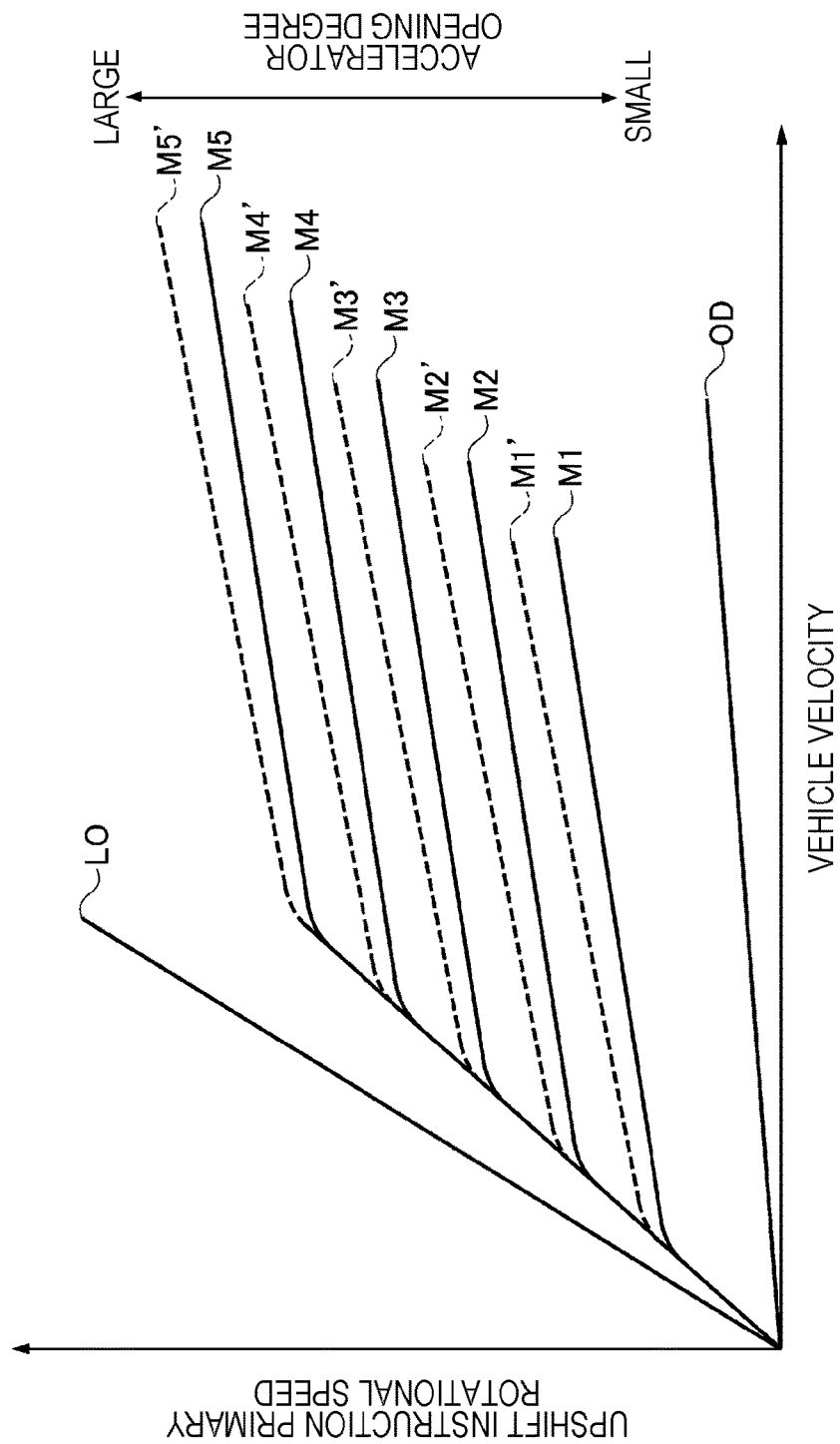
FIG. 3 illustrates exemplary maps for upshift instruction primary rotational speed.

A control device 1 for a continuously variable transmission according to the example will be described with reference to FIGS. 1 to 3. FIG. 1 is a block diagram illustrating the configuration of the control device 1 for a continuously variable transmission according to the example. FIGS. 2A and 2B illustrate kick-down control performed by the control device 1 for a continuously variable transmission according to the example, FIG. 2A illustrates an exemplary temporal change in primary rotational speed, and FIG. 2B illustrates an exemplary temporal change in accelerator opening degree. FIG. 3 illustrates exemplary maps for upshift instruction primary rotational speed. Note that the control device 1 in this example controls a chain-type CVT provided in a vehicle having an engine as a power source.

Prior to the description of the control device 1, an engine 2 and a CVT 3 will be described. The engine 2 will be described first. The engine 2 is, for example, a horizontally-opposed four-cylinder gasoline engine, but may be of any type. An output shaft 2a of the engine 2 is coupled to the CVT 3. The engine 2 is controlled by an engine control unit (hereinafter referred to as "ECU") 20.

The ECU 20 is a control device that entirely controls the engine 2. The ECU 20 includes a microprocessor that performs calculation, a read only memory (ROM) that stores programs and the like for causing the microprocessor to perform corresponding processing, a random access memory (RAM) that stores various kinds of data such as calculation results, a backup RAM that holds the stored contents by means of a 12 V battery, an input and output interface (I/F), and the like.

The ECU 20 is coupled to various sensors such as a crank angle sensor 21 and an accelerator pedal sensor 22. The crank angle sensor 21 detects the rotational angle of a crank shaft (not illustrated) and outputs the detected rotational angle of the crank shaft to the ECU 20. The accelerator pedal sensor 22 detects a depression amount of the accelerator pedal (not illustrated) (opening degree of the accelerator pedal (hereinafter refereed to as "accelerator opening degree") and outputs the detected accelerator opening degree to the ECU 20.

The ECU 20 calculates the engine rotational speed on the basis of the rotational angle of the crank shaft that has been input from the crank angle sensor 21. On the basis of various kinds of information acquired by these various sensors, the ECU 20 controls the fuel injection amount, ignition timing, and the like.

The CVT 3 converts and outputs driving force from the engine 2. The CVT 3 includes a primary shaft 32 and a secondary shaft 33, the primary shaft 32 being coupled to the output shaft 2a of the engine 2 via a torque converter 30 and a reduction gear 31, the secondary shaft 33 being disposed in parallel with the primary shaft 32. The torque converter 30 has a clutch function and a torque amplifying function.

The primary shaft 32 is equipped with a primary pulley 34. The primary pulley 34 includes a fixed pulley 34a and a movable pulley 34b. The fixed pulley 34a is joined to the primary shaft 32. The movable pulley 34b is attached so as to oppose the fixed pulley 34a slidably but incapable of rotating relative to the axial direction of the primary shaft 32. The primary pulley 34 is configured in such a manner that the interval between conical faces (i.e., pulley groove widths) of the fixed pulley 34a and the movable pulley 34b is changeable.

The secondary shaft 33 is equipped with a secondary pulley 35. The secondary pulley 35 includes a fixed pulley 35a and a movable pulley 35b. The fixed pulley 35a is joined to the secondary shaft 33. The movable pulley 35b is attached so as to oppose the fixed pulley 35a slidably but incapable of rotating relative to the axial direction of the secondary shaft 33. The secondary pulley 35 is configured in such a manner that the interval between conical faces (i.e., pulley groove widths) of the fixed pulley 35a and the movable pulley 35b is changeable.

A chain 36 that transmits driving force runs between the primary pulley 34 and the secondary pulley 35. The CVT 3 changes pulley groove widths of the primary pulley 34 and the secondary pulley 35 to change the ratio of the pitch radii (pulley ratio) of the chain 36 with respect to the primary pulley 34 and the secondary pulley 35, thereby changing a gear ratio steplessly. Note that a gear ratio i can be expressed as i=Rs/Rp where Rp is the pitch radius of the chain 36 with respect to the primary pulley 34 and where Rs is the pitch radius of the chain 36 with respect to the secondary pulley 35. The gear ratio (pulley ratio) is determined by the rotational speed of the primary pulley 34 (hereinafter referred to as "primary rotational speed") and the vehicle velocity.

The movable pulley 34b of the primary pulley 34 includes a primary driving oil chamber (hydraulic pressure cylinder chamber) 34c. The movable pulley 35b of the secondary pulley 35 includes a secondary driving oil chamber (hydraulic pressure cylinder chamber) 35c. A gear pressure for changing the pulley ratio (gear ratio) and a clamp pressure for preventing slippage of the chain 36 are introduced in the primary driving oil chamber 34c, whereas a clamp pressure is introduced in the secondary driving oil chamber 35c.

The hydraulic pressure (gear pressure and clamp pressure) for shifting the CVT 3 is supplied from a valve body 40. The valve body 40 has a control valve mechanism (C/V) 41 incorporated therein. By opening and closing hydraulic passages formed in the valve body 40 using a plurality of spool valves (not illustrated) and solenoid valves (not illustrated) that cause the respective spool valves to move, for example, the control valve mechanism 41 supplies each hydraulic pressure obtained by regulating hydraulic pressure (line pressure) ejected from an oil pump (not illustrated) to the primary driving oil chamber 34c and the secondary driving oil chamber 35c. In addition, the control valve mechanism 41 supplies a regulated hydraulic pressure also to, for example, a forward-and-backward advancement switching mechanism that switches forward advancement and backward advancement of the vehicle.

The control device 1 entirely controls the CVT 3. In particular, if kick-down conditions are satisfied (if the driver intends to accelerate (depresses the accelerator pedal), the control device 1 performs kick-down control for executing downshift in which the gear ratio of the CVT 3 is changed to a low-gear gear ratio (the primary rotational speed is increased). In addition, if second-time kick-down conditions are satisfied during kick-down control (kick-down mode) (if the driver intends to further accelerate (further depresses the accelerator pedal), the control device 1 sets a downshift amount and performs second-time kick-down control for executing downshift in which the gear ratio is changed by adding the downshift amount (the primary rotational speed is increased by a predetermined rotational speed). In addition, if upshift conditions are satisfied (if the primary rotational speed reaches a predetermined rotational speed) during kick-down control, the control device 1 sets an upshift amount and performs multistage-like kick-down control for executing upshift by the upshift amount (for decreasing the primary rotational speed by a predetermined rotational speed).

Each control of the control device 1 is performed by a transmission control unit (TCU) 10. The TCU 10 includes a microprocessor, a ROM, a RAM, a backup RAM, an input and output I/F, and the like, as in the ECU 20.

The TCU 10 is coupled to various sensors such as a primary pulley rotation sensor 11 and an output shaft rotation sensor 12. In addition, the TCU 10 receives various kinds of information such as information on an accelerator opening degree and an engine rotational speed from the ECU 20 through a controller area network (CAN) 50.

The primary pulley rotation sensor 11 detects the rotational speed of the primary pulley 34 (primary rotational speed) and outputs the detected primary rotational speed to the TCU 10. The output shaft rotation sensor 12 detects the rotational speed of the output shaft (the secondary shaft 33) and outputs the detected rotational speed of the output shaft to the TCU 10. The TCU 10 calculates the vehicle velocity on the basis of the rotational speed of the output shaft. Note that the vehicle velocity may be a vehicle velocity (vehicle body velocity) calculated on the basis of the wheel speed detected by a wheel speed sensor provided for each wheel, for example. The TCU 10 receives the vehicle velocity from, for example, the ECU 20 through the CAN 50.

Referring to a shift map, the TCU 10 performs control in which the gear ratio is automatically and steplessly shifted in accordance with the vehicle driving state (e.g., accelerator opening degree or vehicle velocity). In this control, a target value of the primary rotational speed (hereinafter referred to as "target primary rotational speed") is set so as to obtain a predetermined gear ratio, and each solenoid valve of the valve body 40 (the control valve mechanism 41) is controlled in such a manner that the actual primary rotational speed (primary rotational speed detected by the primary pulley rotation sensor 11) becomes equal to the target primary rotational speed, and thereby the gear ratio is changed. The shift map is stored in the ROM in the TCU 10.

In particular, the TCU 10 has a kick-down function of performing kick-down control including second-time kick-down control and multistage-like kick-down control. In order to realize this function, the TCU 10 includes a kick-down determining unit 13, a second-time kick-down determining unit 14, a first-step controller 15, a second-time kick-down first-step controller 16, a second-step controller 17, a third-step controller 18, and a second-time kick-down upshift conditions setting unit 19. In the example, the second-time kick-down determining unit 14 may serve as a "second-time kick-down determining unit" in the claims, the second-time kick-down first-step controller 16 may serve as a "second-time kick-down controller" in the claims, the second-step controller 17 may serve as an "upshift determining unit" in the claims, the third-step controller 18 may serve as an "upshift controller" in the claims, and the second-time kick-down upshift conditions setting unit 19 may serve as a "second-time kick-down upshift conditions setting unit" in the claims. In the TCU 10, each of the kick-down determining unit 13, the second-time kick-down determining unit 14, the first-step controller 15, the second-time kick-down first-step controller 16, the second-step controller 17, the third-step controller 18, and the second-time kick-down upshift conditions setting unit 19 realizes corresponding processing by the microprocessor executing programs stored in the ROM.

Prior to the description of specific processing performed by each of the kick-down determining unit 13, the second-time kick-down determining unit 14, the first-step controller 15, the second-time kick-down first-step controller 16, the second-step controller 17, the third-step controller 18, and the second-time kick-down upshift conditions setting unit 19 in the TCU 10, kick-down control including second-time kick-down control and multistage-like kick-down control according to the example will be described with reference to FIGS. 2A and 2B. FIGS. 2A and 2B illustrate exemplary temporal changes in the primary rotational speed and the accelerator opening degree if second-time kick-down is performed during kick-down control. In FIG. 2A, the horizontal axis represents the time, and the vertical axis represents the primary rotational speed. In FIG. 2B, the horizontal axis represents the time, and the vertical axis represents the accelerator opening degree.

In FIG. 2A, a dot-and-dashed line (thick line) represents an exemplary temporal change in an actual primary rotational speed PR (corresponding to the actual shift line) during kick-down control. A solid line (thick line) represents an exemplary temporal change in a pre-processing target primary rotational speed BTR. The pre-processing target primary rotational speed is the upper limit or lower limit of the target primary rotational speed at each step described later. A dashed line (thick line) represents an exemplary temporal change in a post-limiting-processing target primary rotational speed ATR (corresponding to a target shift line). The post-limiting-processing target primary rotational speed is a target primary rotational speed in every fixed period at each step and is the upper limit or lower limit of the target primary rotational speed having a limited change amount. The limited change amount is set on the basis of a map for the limited change amount and is a change amount of the primary rotational speed per unit period. The map for the limited change amount is a map in which the limited change amount value is determined for each stage by using a plurality of parameters and is stored in the ROM in the TCU 10. A dot-and-dashed line represents an upshift instruction primary rotational speed UD. The upshift instruction primary rotational speed is a primary rotational speed that corresponds to conditions for executing upshift under multistage-like kick-down control. Another dot-and-dashed line represents a first-step lower-limit primary rotational speed LL. Still another dot-and-dashed line represents an exemplary temporal change in a primary rotational speed UR (corresponding to a shift line) under normal shift control in which kick-down control is not performed. In FIG. 2B, a solid line (thick line) represents an exemplary temporal change in an accelerator opening degree AP. Note that in the TCU 10, the post-limiting-processing target primary rotational speed is set for every fixed period, and each solenoid valve of the valve body 40 is controlled in such a manner that the actual primary rotational speed becomes equal to the post-limiting-processing target primary rotational speed.

Kick-down control (kick-down mode) is performed if kick-down conditions are satisfied during normal shift control. Second-time kick-down control is performed if second-time kick-down conditions are satisfied during kick-down control. Multistage-like kick-down control is performed if upshift conditions are satisfied during kick-down control. Each control is performed by taking three steps (a first step ST1 or ST1', a second step ST2, and a third step ST3). A first step may be a first step ST1 for normal kick-down control or a first step ST1' for second-time kick-down control. The first step ST1 is executed if the kick-down conditions are satisfied. The second-time kick-down first step ST1' is executed if the second-time kick-down conditions are satisfied. A second step ST2 is executed upon ending the first step ST1 or ST1' or a third step ST3. The third step ST3 is executed upon ending the second step ST2.

The first step ST1 is a step for executing downshift to the pre-processing target primary rotational speed BTR that is determined on the basis of the vehicle velocity and the accelerator opening degree. In the first step ST1, the pre-processing target primary rotational speed BTR becomes equal to the first-step lower-limit primary rotational speed LL. In the first step ST1, the post-limiting-processing target primary rotational speed ATR is increased to reach the pre-processing target primary rotational speed BTR (the first-step lower-limit primary rotational speed LL). The first-step lower-limit primary rotational speed LL is a primary rotational speed that is set on the basis of a map for the first-step lower-limit primary rotational speed and that is determined on the basis of the vehicle velocity and the accelerator opening degree. The map for the first-step lower-limit primary rotational speed is a map in which the first-step lower-limit primary rotational speed is determined by using the vehicle velocity and the accelerator opening degree as parameters and is stored in the ROM in the TCU 10. The first step ST1 is executed during a first-step execution period. The first-step execution period is determined by matching. The length of the first-step execution period is stored in the ROM in the TCU 10. Note that although the limited change amount of a given value is determined on the basis of the vehicle velocity, accelerator opening degree, and engine rotational speed in the first step ST1, the limited change amount is almost negligible because the purpose of the first step ST1 is to change the actual primary rotational speed to the pre-processing target primary rotational speed BTR during the above-described first-step execution period.

The second-time kick-down first step ST1' is a step in which the pre-processing target primary rotational speed BTR for second-time kick-down (=the post-limiting-processing target primary rotational speed ATR obtained when second-time kick-down is determined+a second-time kick-down downshift amount DS) is set and in which downshift to the pre-processing target primary rotational speed BTR for second-time kick-down is executed. The second-time kick-down downshift amount DS is a primary rotational speed by which the actual primary rotational speed is to be increased (by which downshift is to be executed). The second-time kick-down downshift amount DS is set on the basis of a map for the second-time kick-down downshift amount and determined on the basis of the accelerator opening degree and the engine rotational speed (or the primary rotational speed may be used instead of the engine rotational speed). The map for the second-time kick-down downshift amount is a map in which the second-time kick-down downshift amount is determined by using the accelerator opening degree and the engine rotational speed as parameters and is stored in the ROM in the TCU 10. In the first step ST1', the post-limiting-processing target primary rotational speed ATR is increased to reach the pre-processing target primary rotational speed BTR for second-time kickdown. The first step ST1' is executed during the first-step execution period as in the first step ST1. Note that although the limited change amount of a given value is determined on the basis of the vehicle velocity, accelerator opening degree, and engine rotational speed in the second-time kick-down first step ST1' as in the first step ST1, the limited change amount is almost negligible because the purpose of the first step ST1' is to change the actual primary rotational speed to the pre-processing target primary rotational speed BTR for second-time kick-down during the above-described first-step execution period.

The second step ST2 is a step in which the post-limiting-processing target primary rotational speed ATR is changed to the pre-processing target primary rotational speed BTR on the basis of the given limited change amount determined on the basis of the vehicle velocity and the accelerator opening degree. In the second step ST2, the pre-processing target primary rotational speed BTR becomes equal to the upshift instruction primary rotational speed UD. In the second step ST2, the post-limiting-processing target primary rotational speed ATR is gradually changed on the basis of the given limited change amount to reach the pre-processing target primary rotational speed BTR (the upshift instruction primary rotational speed UD). Accordingly, the gear ratio may gradually downshift or upshift in some cases, or the gear ratio may be constant in some cases, depending on the setting of the limited change amount. The limited change amount (the map for the limited change amount) is determined by matching. The upshift instruction primary rotational speed UD is a primary rotational speed that is set on the basis of a map for the upshift instruction primary rotational speed and that is determined on the basis of the vehicle velocity and the accelerator opening degree. The map for the upshift instruction primary rotational speed is a map in which the upshift instruction primary rotational speed is determined by using the vehicle velocity and the accelerator opening degree as parameters and is stored in the ROM in the TCU 10. This map will be described later in detail. Although the second step ST2 is basically ended upon the post-limiting-processing target primary rotational speed ATR reaching the pre-processing target primary rotational speed BTR (upon the upshift conditions being satisfied), the second step ST2 is continued at least during a predetermined minimum execution period even if the post-limiting-processing target primary rotational speed ATR has reached the pre-processing target primary rotational speed BTR. The minimum execution period is determined by matching. The length of the minimum execution period is stored in the ROM in the TCU 10.

The third step ST3 is a step in which the pre-processing target primary rotational speed BTR for upshift (=the upshift instruction primary rotational speed UD–an upshift amount US) is set and in which upshift to the pre-processing target primary rotational speed BTR for upshift is executed. The upshift amount US is a primary rotational speed by which the actual primary rotational speed is to be decreased (by which upshift is to be executed). The upshift amount US is set on the basis of a map for the upshift amount and determined on the basis of the post-limiting-processing target primary rotational speed ATR (the upshift instruction primary rotational speed UD) at the start of upshift (the start of the third step ST3) and the number of times of upshift. The map for the upshift amount is stored in the ROM in the TCU 10. In the third step ST3, the post-limiting-processing target primary rotational speed ATR is decreased to reach the pre-processing target primary rotational speed BTR for upshift on the basis of the given limited change amount determined on the basis of the actual primary rotational speed, the actual gear ratio, and the actual engine shaft torque that are obtained at the start of the third step ST3.

In the exemplary case illustrated in FIG. 2B, the kick-down conditions are satisfied at Time A1 (when the driver depresses the accelerator pedal) when the accelerator opening degree AP is increased for the first time. In response to this, first, the first step ST1 is executed, and the post-limiting-processing target primary rotational speed ATR is increased to the first-step lower-limit primary rotational speed LL. Then, the second step ST2 is executed, and the post-limiting-processing target primary rotational speed ATR is increased on the basis of the given limited change amount determined on the basis of the vehicle velocity and the accelerator opening degree. Upon the post-limiting-processing target primary rotational speed ATR reaching the upshift instruction primary rotational speed UD, the third step ST3 is executed, and the post-limiting-processing target primary rotational speed ATR is decreased by the upshift amount US. In the above manner, upshift is executed by a predetermined amount by performing multistage-like kick-down control during kick-down control.

Then, the second step ST2 is executed, and the post-limiting-processing target primary rotational speed ATR is increased on the basis of the given limited change amount determined on the basis of the vehicle velocity and the accelerator opening degree. The second-time kick-down conditions are satisfied at Time A2 (when the driver further depresses the accelerator pedal) when the accelerator opening degree AP is increased for the second time in the second step ST2 in FIG. 2B. In response to this, the first step ST1' is executed, and the post-limiting-processing target primary rotational speed ATR is increased by the second-time kick-down downshift amount DS. In the above manner, downshift is executed by adding a predetermined amount by performing second-time kick-down control during kick-down control. After this processing, the second step ST2 and the third step ST3 are repeatedly executed in the same manner. Thus, downshift and upshift are repeatedly executed during acceleration caused by kick-down, and the gear ratio changes in a multistage (stepwise) manner.

Now, specific processing performed by each of the kick-down determining unit 13, the second-time kick-down determining unit 14, the first-step controller 15, the second-time kick-down first-step controller 16, the second-step controller 17, the third-step controller 18, and the second-time kick-down upshift conditions setting unit 19 in the TCU 10 will be described below. The kick-down determining unit 13 determines whether the kick-down conditions are satisfied during normal shift control. The kick-down conditions correspond to, for example, whether the accelerator opening degree is greater than or equal to an accelerator opening degree for determining kick-down. The accelerator opening degree for determining kick-down is determined by matching. The accelerator opening degree for determining kick-down is stored in the ROM in the TCU 10. In addition, the kick-down determining unit 13 determines whether conditions for completing kick-down control are satisfied during kick-down control. The conditions for completing kick-down control correspond to, for example, whether the accelerator opening degree is less than or equal to an accelerator opening degree for determining kick-down control completion. The accelerator opening degree for determining kick-down control completion is determined by matching. The accelerator opening degree for determining kick-down control completion is stored in the ROM in the TCU 10.

The second-time kick-down determining unit 14 determines whether the second-time kick-down conditions are satisfied during kick-down control. The second-time kick-down conditions correspond to, for example, whether the accelerator opening degree is greater than or equal to an accelerator opening degree for determining second-time kick-down and whether an accelerator opening degree speed is higher than or equal to an accelerator opening speed for determining second-time kick-down. The accelerator opening degree for determining second-time kick-down and the accelerator opening speed for determining second-time kick-down are determined by matching. The accelerator opening degree for determining second-time kick-down is greater than the accelerator opening degree for determining kick-down. The accelerator opening degree for determining second-time kick-down and the accelerator opening speed for determining second-time kick-down are stored in the ROM in the TCU 10.

If the kick-down determining unit 13 determines that the kick-down conditions are satisfied, in accordance with the vehicle velocity and the accelerator opening degree at the start of the first step (when kick-down is determined) by referring to the map for the first-step lower-limit primary rotational speed, the first-step controller 15 sets the pre-processing target primary rotational speed (=the first-step lower-limit primary rotational speed). Then, the first-step controller 15 sets the post-limiting-processing target primary rotational speed for every fixed period so as to reach the pre-processing target primary rotational speed during the first-step execution period and controls each solenoid valve of the valve body 40 in such a manner that the actual primary rotational speed becomes equal to the post-limiting-processing target primary rotational speed. When the first-step execution period has elapsed from the start of the processing, the first-step controller 15 ends the processing.

If the second-time kick-down determining unit 14 determines that the second-time kick-down conditions are satisfied, in accordance with the accelerator opening degree and the engine rotational speed at the start of the second-time kick-down first step (when second-time kick-down is determined) by referring to the map for the second-time kick-down downshift amount, the second-time kick-down first-step controller 16 determines the second-time kick-down downshift amount and sets the pre-processing target primary rotational speed by adding the second-time kick-down downshift amount to the post-limiting-processing target primary rotational speed obtained when second-time kick-down is determined. Then, the second-time kick-down first-step controller 16 performs the same processing as the first-step controller 15 using the pre-processing target primary rotational speed.

After the first-step controller 15 or the second-time kick-down first-step controller 16 has ended the processing, or after the third-step controller 18 has ended the processing, in accordance with the vehicle velocity and the accelerator opening degree by referring to the map for the upshift instruction primary rotational speed, the second-step controller 17 sets the pre-processing target primary rotational speed (=the upshift instruction primary rotational speed). Then, in accordance with the vehicle velocity and the accelerator opening degree at the start of the second step by referring to the map for the limited change amount, the second-step controller 17 determines the limited change amount value, sets the post-limiting-processing target primary rotational speed using the limited change amount for every fixed period, and controls each solenoid valve of the valve body 40 in such a manner that the actual primary rotational speed becomes equal to the post-limiting-processing target primary rotational speed. The second-step controller 17 determines whether the post-limiting-processing target primary rotational speed has reached the upshift instruction primary rotational speed (the pre-processing target primary rotational speed), and if the post-limiting-processing target primary rotational speed has reached the upshift instruction primary rotational speed, the second-step controller 17 ends the processing. Note that, if the minimum execution period has not elapsed from the start of the processing, the second-step controller 17 continues the processing until the minimum execution period elapses with the post-limiting-processing target primary rotational speed fixed at the upshift instruction primary rotational speed. Note that the post-limiting-processing target primary rotational speed reaching the upshift instruction primary rotational speed corresponds to conditions for executing upshift (the third step). In addition, the continuation of the second step over the minimum execution period or longer corresponds to conditions for allowing execution of upshift.

Note that, if second-time kick-down control (the second-time kick-down first-step controller 16) is not performed after kick-down control has been started, the second-step controller 17 sets a normal upshift instruction primary rotational speed using a map for the normal upshift instruction primary rotational speed and uses the normal upshift instruction primary rotational speed for the upshift conditions. In addition, after second-time kick-down control has been performed after kick-down control has been started, the second-step controller 17 uses, for the upshift conditions, a second-time kick-down upshift instruction primary rotational speed that is set by the second-time kick-down upshift conditions setting unit 19.

Exemplary maps for the normal upshift instruction primary rotational speed used by the second-step controller 17 will be described with reference to FIG. 3. In FIG. 3, the horizontal axis represents the vehicle velocity, and the vertical axis represents the upshift instruction primary rotational speed, and FIG. 3 illustrates a low gear LO and an overdrive OD. In FIG. 3, maps M1 to M5 in solid lines are maps for the normal upshift instruction primary rotational speed, which are obtained at respective accelerator opening degrees. In the maps M1 to M5, as the vehicle velocity is increased, a higher upshift instruction primary rotational speed is set. This example illustrates a case where the accelerator opening degree is divided into five stages, and becomes smaller on the map M1 side, and the accelerator opening degree becomes larger on the map M5 side. Comparing the maps M1 to M5, as the accelerator opening degree is increased, a higher upshift instruction primary rotational speed is set. Note that although this example illustrates the maps in which the accelerator opening degree is divided into five stages, maps may be divided into four or less stages or six or more stages.

After the second-step controller 17 has ended the processing, in accordance with the post-limiting-processing target primary rotational speed (the upshift instruction primary rotational speed) at the start of the third step (at the start of upshift) and the number of times of upshift by referring to the map for the upshift amount, the third-step controller 18 determines the upshift amount and sets the pre-processing target primary rotational speed by subtracting the upshift amount from the upshift instruction primary rotational speed. Then, in accordance with the vehicle velocity and the accelerator opening degree at the start of the third step by referring to the map for the limited change amount, the third-step controller 18 determines the limited change amount value and sets the post-limiting-processing target primary rotational speed using the limited change amount value for every fixed period, and controls each solenoid valve of the valve body 40 in such a manner that the actual primary rotational speed becomes equal to the post-limiting-processing target primary rotational speed. The third-step controller 18 determines whether the post-limiting-processing target primary rotational speed has reached the pre-processing target primary rotational speed, and if the post-limiting-processing target primary rotational speed has reached the pre-processing target primary rotational speed, the third-step controller 18 ends the processing.

Note that, if second-time kick-down control is not performed after kick-down control has been started, the third-step controller 18 sets the pre-processing target primary rotational speed using the above-described normal upshift instruction primary rotational speed. In addition, after second-time kick-down control has been performed after kick-down control has been started, the third-step controller 18 sets the pre-processing target primary rotational speed using the second-time kick-down upshift instruction primary rotational speed that is set by the second-time kick-down upshift conditions setting unit 19.

If the second-time kick-down determining unit 14 determines that the second-time kick-down conditions are satisfied, the second-time kick-down upshift conditions setting unit 19 sets the second-time kick-down upshift conditions. Specifically, by referring to a map for the second-time kick-down upshift instruction primary rotational speed, which is different from the above-described map for the normal upshift instruction primary rotational speed, the second-time kick-down upshift conditions setting unit 19 determines the second-time kick-down upshift instruction primary rotational speed in accordance with the vehicle velocity and the accelerator opening degree. The second-time kick-down upshift instruction primary rotational speed is higher, by a predetermined amount, compared to the normal upshift instruction primary rotational speed at a same velocity and a same accelerator opening degree. By determining whether upshift is to be executed on the basis of the upshift conditions using the second-time kick-down upshift instruction primary rotational speed (whether the second step is to be ended), rather than the normal upshift instruction primary rotational speed, upshift (the third step) can be started at a lower-gear gear ratio (higher primary rotational speed), and the second-step execution period can be extended.

In FIG. 3, maps M1' to M5' in dashed lines are maps for the second-time kick-down upshift instruction primary rotational speed, which are obtained at respective accelerator opening degrees as in the normal maps M1 to M5. Comparing the maps M1' to M5' with the normal maps M1 to M5, respectively, an upshift instruction primary rotational speed that is a predetermined amount higher than that in the maps M1 to M5 is set for each map. In particular, in the exemplary case illustrated in FIG. 3, as the vehicle velocity is increased, the amount of the upshift instruction primary rotational speed to be increased is gradually increased. By using the maps M1' to M5', after second-time kick-down has been performed, the upshift instruction primary rotational speed is higher than that in the case of using the maps M1 to M5. Note that the maps M1' to M5' may be obtained by increasing the upshift instruction primary rotational speed by a fixed amount compared with the normal maps M1 to M5.

Figures 4A, 4B:
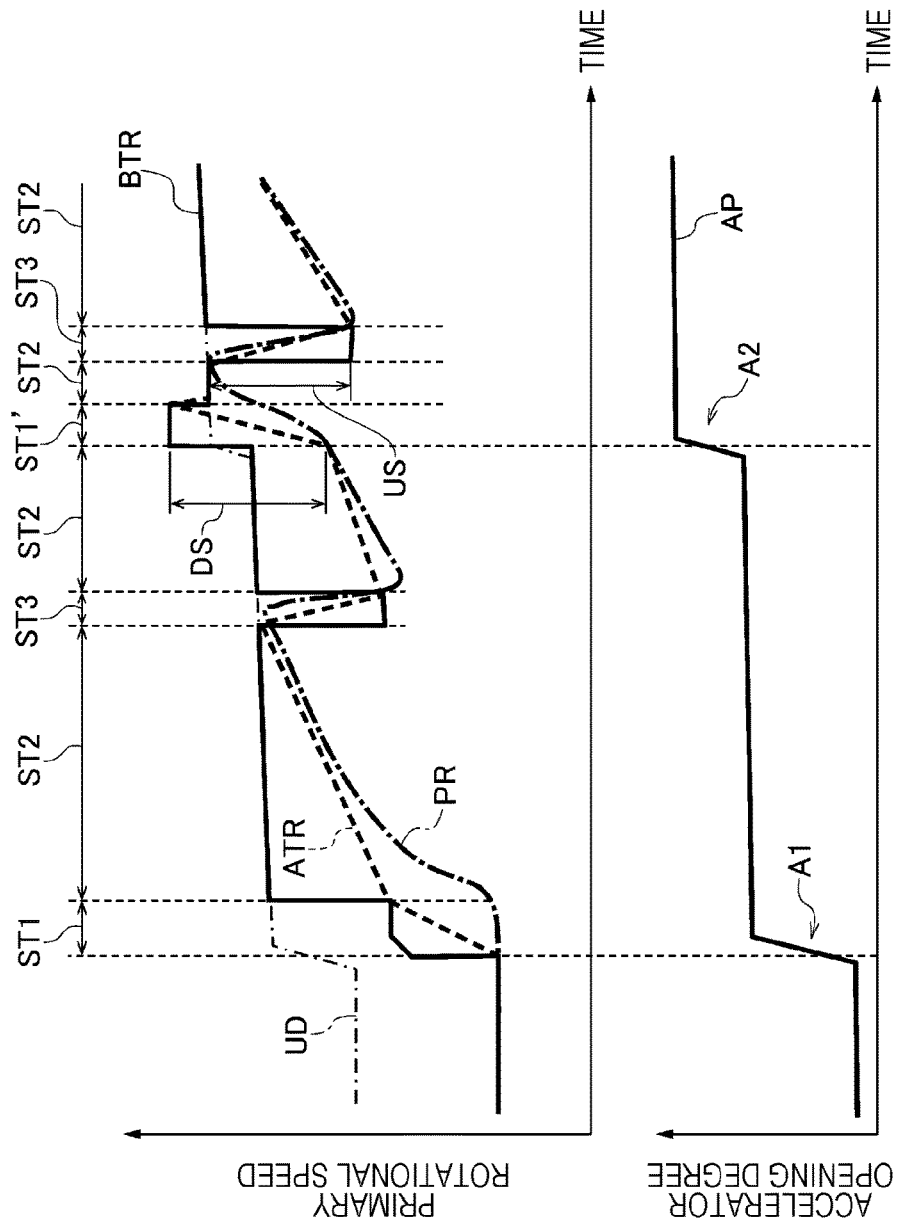
FIGS. 4A and 4B illustrate a case where normal upshift conditions are used after second-time kick-down.

Here, referring to FIGS. 4A and 4B, a problem that may arise when the normal upshift instruction primary rotational speed is used for the upshift conditions even after second-time kick-down has been performed. FIGS. 4A and 4B illustrate a case where normal upshift conditions are used after second-time kick-down has been performed. FIG. 4A illustrates an exemplary temporal change in the primary rotational speed, and FIG. 4B illustrates an exemplary temporal change in the accelerator opening degree. The first step ST1' and steps thereafter after the second-time kick-down conditions have been satisfied will be described below.

In the first step ST1', the second-time kick-down downshift amount DS is determined in accordance with the accelerator opening degree and the engine rotational speed with reference to the map for the second-time kick-down downshift amount, the pre-processing target primary rotational speed BTR for second-time kick-down (=the post-limiting-processing target primary rotational speed ATR obtained when second-kick-down is determined+the second-time kick-down downshift amount DS) is set, and downshift to the pre-processing target primary rotational speed BTR for second-time kick-down is executed. In this exemplary case, the pre-processing target primary rotational speed BTR is higher than the upshift instruction primary rotational speed UD. Note that, in the first step ST1 after the kick-down conditions have been satisfied, the first-step lower-limit primary rotational speed determined on the basis of the vehicle velocity and the accelerator opening degree is set as the pre-processing target primary rotational speed BTR, and accordingly, the pre-processing target primary rotational speed BTR does not become higher than the upshift instruction primary rotational speed UD.

Then, in the second step ST2, the normal upshift instruction primary rotational speed UD in accordance with the vehicle velocity and the accelerator opening degree is determined as the pre-processing target primary rotational speed BTR by using the map for the normal upshift instruction primary rotational speed (e.g., the maps M1 to M5 illustrated in FIG. 3). The post-limiting-processing target primary rotational speed ATR in the first step ST1' becomes higher than the normal upshift instruction primary rotational speed UD, and accordingly, in the second step ST2, the post-limiting-processing target primary rotational speed ATR is fixed at the upshift instruction primary rotational speed UD. In this case, the post-limiting-processing target primary rotational speed ATR has already reached the upshift instruction primary rotational speed UD (the upshift conditions are satisfied before transition to the second step ST2), and accordingly, the second step ST2 is executed only during the minimum execution period (conditions for allowing execution of upshift). Accordingly, immediately after transition to the second step ST2, the process transitions to the third step ST3 (upshift). Therefore, sufficient acceleration is not performed in the second step ST2.

In the third step ST3, with reference to the map for the upshift amount, the upshift amount US in accordance with the post-limiting-processing target primary rotational speed ATR (the upshift instruction primary rotational speed UD) at the start of upshift is determined, the pre-processing target primary rotational speed BTR for upshift (=the normal upshift instruction primary rotational speed UD−the upshift amount US) is set, and upshift to the pre-processing target primary rotational speed BTR for upshift is executed. In the exemplary case illustrated in FIGS. 4A and 4B, the pre-processing target primary rotational speed BTR obtained by subtracting the upshift amount US from the normal upshift instruction primary rotational speed UD is lower than the post-limiting-processing target primary rotational speed ATR (the actual primary rotational speed PR) obtained when second-time kick-down is determined (at the start of the first step ST1'), and accordingly, when the third step ST3 is ended, the actual primary rotational speed PR is lower than the actual primary rotational speed PR obtained when second-time kick-down is determined.

In the above manner, the acceleration period is not sufficiently provided in the second step ST2, and after upshift has been executed, the actual primary rotational speed PR becomes lower than that obtained when second-time kickdown is determined. Accordingly, acceleration failure occurs in spite of a driver's second-time kick-down operation (operation of further depressing the accelerator pedal). At the same time, the feeling of acceleration produced by the engine sound is reduced as a result of reduction in the engine rotational speed. As a result, second-time kick-down control is completed before acceleration intended by performing second-time kick-down is achieved, making the driver feel strange (feel uncomfortable because the vehicle does not run as intended).

Next, referring to FIGS. 5A and 5B, the case where the second-time kick-down upshift instruction primary rotational speed is used for the upshift conditions after second-time kick-down has been performed will be described. FIGS. 5A and 5B illustrate a case where the second-time kick-down upshift conditions are used after second-time kick-down has been performed, FIG. 5A illustrates an exemplary temporal change in the primary rotational speed, and FIG. 5B illustrates an exemplary temporal change in the accelerator opening degree. The first step ST1' and steps thereafter after the second-time kick-down conditions have been satisfied will be described below. Note that the first step ST1' is the same as that described above with reference to FIGS. 4A and 4B, and therefore description thereof is omitted.

In the second step ST2, a second-time kick-down upshift instruction primary rotational speed UD' in accordance with the vehicle velocity and the accelerator opening degree is determined as the pre-processing target primary rotational speed BTR by using the map for the second-time kick-down upshift instruction primary rotational speed (e.g., the maps M1' to M5' illustrated in FIG. 3). In the second step ST2, on the basis of the given limited change amount, the post-limiting-processing target primary rotational speed ATR is changed to the second-time kick-down upshift instruction primary rotational speed UD' (the pre-processing target primary rotational speed BTR). The second-time kick-down upshift instruction primary rotational speed UD' is higher than the normal upshift instruction primary rotational speed UD and higher than the post-limiting-processing target primary rotational speed ATR at the end of the first step ST1'. Accordingly, a period in which the post-limiting-processing target primary rotational speed ATR reaches the second-time kick-down upshift instruction primary rotational speed UD' is sufficiently provided in the second step ST2, and upon acceleration being sufficiently performed in the second step ST2, the process transitions to the third step ST3 (upshift).

In the third step ST3, with reference to the map for the upshift amount, the upshift amount US in accordance with the post-limiting-processing target primary rotational speed ATR at the start of upshift is determined, the pre-processing target primary rotational speed BTR for upshift (=the second-time kick-down upshift instruction primary rotational speed UD'−the upshift amount US) is set, and upshift to the pre-processing target primary rotational speed BTR for upshift is executed. The second-time kick-down upshift instruction primary rotational speed UD' is higher than the normal upshift instruction primary rotational speed UD, and accordingly, the pre-processing target primary rotational speed BTR for upshift is higher than the pre-processing target primary rotational speed BTR for upshift illustrated in FIGS. 4A and 4B. Accordingly, the pre-processing target primary rotational speed BTR for upshift is higher than the post-limiting-processing target primary rotational speed ATR (the actual primary rotational speed PR) obtained when second-time kick-down is determined. Therefore, the actual primary rotational speed PR at the end of the third step ST3 is higher than the actual primary rotational speed PR obtained when second-time kick-down is determined.

In this case, upshift is not executed in the third step ST3 immediately after downshift caused by second-time kick-down has been executed, and the primary rotational speed after upshift is high. Accordingly, acceleration failure does not occur, and the engine sound with the feeling of acceleration can be maintained. As a result, acceleration intended by second-time kick-down (intended by the driver) can be achieved, making the driver feel acceleration.

Figures 6A, 6B:
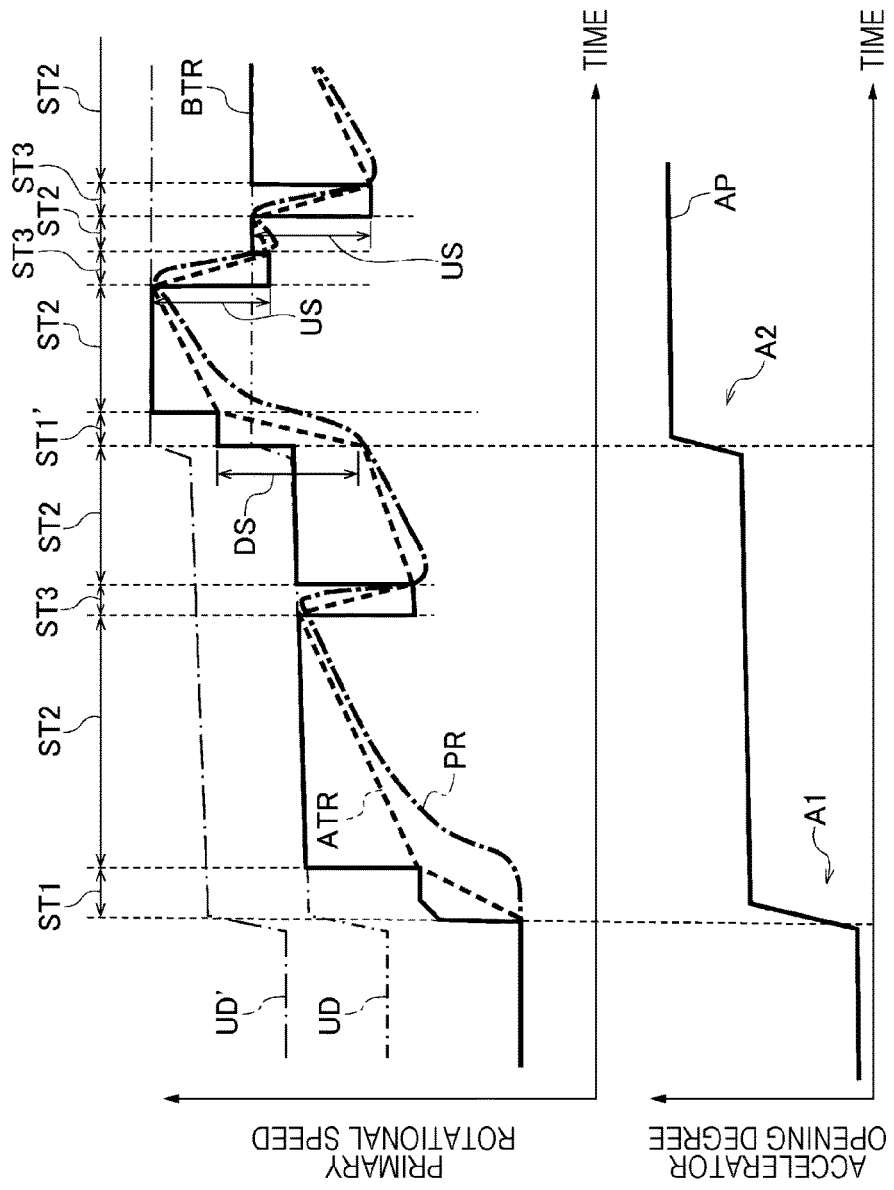
FIGS. 6A and 6B illustrate a case where second-time kick-down upshift conditions are used after second-time kick-down and where normal upshift conditions are used thereafter.

Next, referring to FIGS. 6A and 6B, the case will be described in which the second-time kick-down upshift instruction primary rotational speed is used for the upshift conditions only at upshift for the first time after second-time kick-down has been performed and in which the normal upshift instruction primary rotational speed is used for the upshift conditions at upshift thereafter. FIGS. 6A and 6B illustrate a case where the second-time kick-down upshift conditions are used once second-time kick-down has been performed and where the normal upshift conditions are used thereafter, FIG. 6A illustrates an exemplary temporal change in the primary rotational speed, and FIG. 6B illustrates an exemplary temporal change in the accelerator opening degree. The first step ST1' and steps thereafter after the second-time kick-down conditions have been satisfied will be described below. Note that the first step ST1' after second-time kick-down has been performed, the second step ST2 for the first time, and the third step ST3 for the first time are the same as those described above with reference to FIGS. 5A and 5B, and therefore description thereof will be omitted.

In the second step ST2 for the second time, the normal upshift instruction primary rotational speed UD in accordance with the vehicle velocity and the accelerator opening degree is determined as the pre-processing target primary rotational speed BTR by using the map for the normal upshift instruction primary rotational speed (e.g., the maps M1 to M5 illustrated in FIG. 3). In the second step ST2, on the basis of the given limited change amount, the post-limiting-processing target primary rotational speed ATR is changed to the normal upshift instruction primary rotational speed UD (the pre-processing target primary rotational speed BTR). However, the normal upshift instruction primary rotational speed UD is lower than the second-time kick-down upshift instruction primary rotational speed UD'. Accordingly, after upshift has been executed in the third step ST3 for the first time after second-time kick-down has been performed, the period in which the post-limiting-processing target primary rotational speed ATR reaches the normal upshift instruction primary rotational speed UD is reduced in the second step ST2 for the second time, and thereby the process transitions to the third step ST3 for the second time after short-period acceleration has been performed in the second step ST2 for the second time.

In the third step ST3 for the second time, the upshift amount US in accordance with the post-limiting-processing target primary rotational speed ATR at the start of upshift is determined with reference to the map for the upshift amount, the pre-processing target primary rotational speed BTR for upshift (=the normal upshift instruction primary rotational speed UD−the upshift amount US) is set, and upshift to the pre-processing target primary rotational speed BTR for upshift is executed. The normal upshift instruction primary rotational speed UD is lower than the second-time kick-down upshift instruction primary rotational speed UD', and accordingly, the pre-processing target primary rotational speed BTR for upshift in the third step ST3 for the second time is low. Accordingly, the actual primary rotational speed PR at the end of the third step ST3 for the second time is lower than the actual primary rotational speed PR at the end of the third step ST3 for the first time and lower than the actual primary rotational speed PR obtained when second-kick-down is determined.

Figures 7A, 7B:
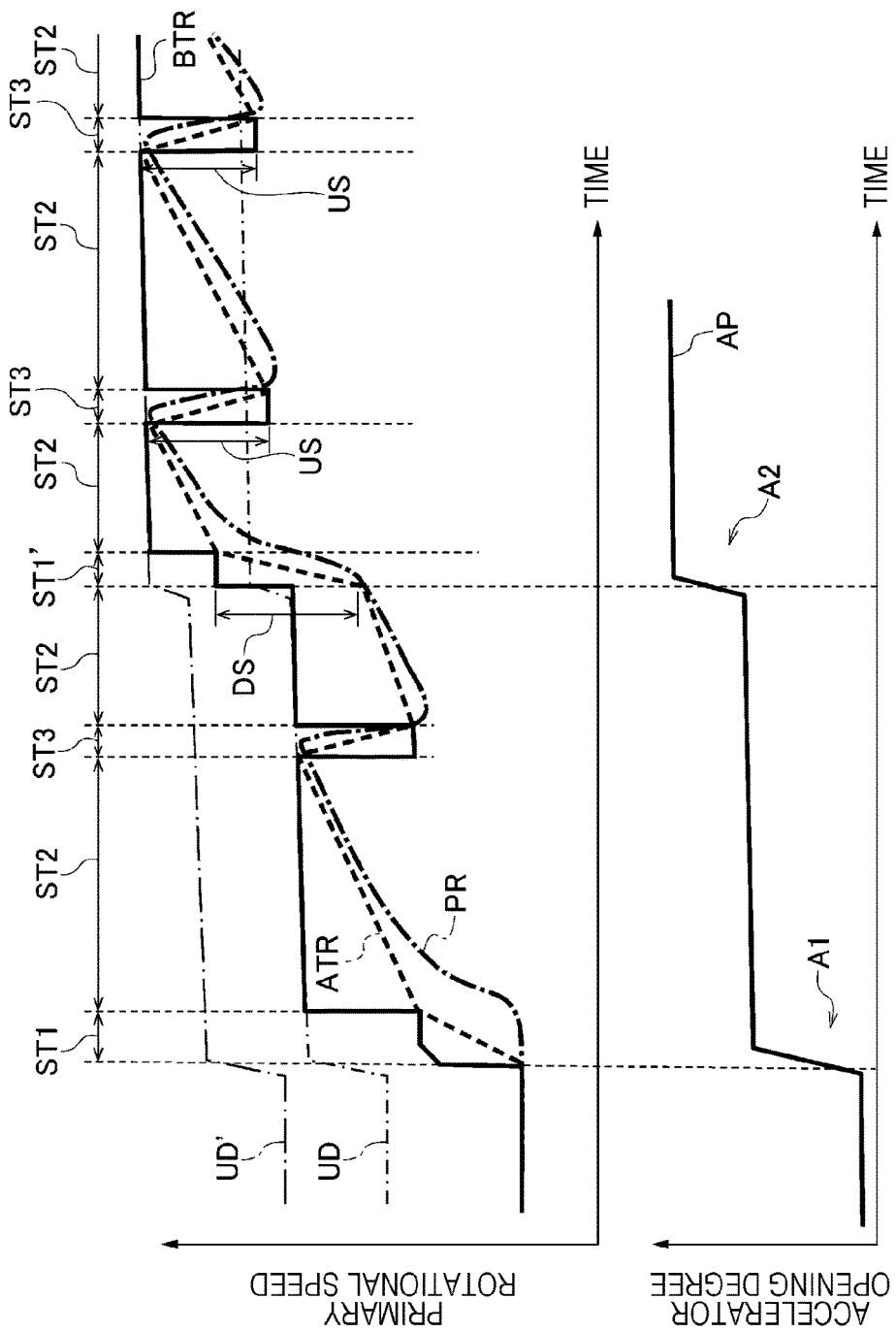
FIGS. 7A and 7B illustrate a case where the second-time kick-down upshift conditions are used until kick-down control is completed after second-time kick-down.

Next, the case where the second-time kick-down upshift instruction primary rotational speed is used for the upshift conditions until kick-down control (kick-down mode) is completed after second-time kick-down has been performed will be described with reference to FIGS. 7A and 7B. FIGS. 7A and 7B illustrate a case where the second-time kick-down upshift conditions are used until kick-down control is completed after second-time kick-down has been performed, FIG. 7A illustrates an exemplary temporal change in the primary rotational speed, and FIG. 7B illustrates an exemplary temporal change in the accelerator opening degree. The first step ST1' and steps thereafter after the second-time kick-down conditions have been satisfied will be described below. Note that the first step ST1' after second-time kick-down has been performed, the second step ST2 for the first time, and the third step ST3 for the first time are the same as those described above with reference to FIGS. 5A and 5B, and therefore description thereof will be omitted.

In the second step ST2 for the second time, the second-time kick-down upshift instruction primary rotational speed UD' in accordance with the vehicle velocity and the accelerator opening degree is determined as the pre-processing target primary rotational speed BTR by using the map for the second-time kick-down upshift instruction primary rotational speed (e.g., the maps M1' to M5' illustrated in FIG. 3). In the second step ST2, on the basis of the given limited change amount, the post-limiting-processing target primary rotational speed ATR is changed to the second-time kick-down upshift instruction primary rotational speed UD' (the pre-processing target primary rotational speed BTR). By using the second-time kick-down upshift instruction primary rotational speed UD', the period in which the post-limiting-processing target primary rotational speed ATR reaches the second-time kick-down upshift instruction primary rotational speed UD' is sufficiently provided also in the second step ST2 for the second time, and upon acceleration being sufficiently performed in the second step ST2, the process transitions to the third step ST3 (upshift) for the second time.

In the third step ST3 for the second time, the upshift amount US in accordance with the post-limiting-processing target primary rotational speed ATR at the start of upshift is determined with reference to the map for the upshift amount, the pre-processing target primary rotational speed BTR for upshift (=the second-time kick-down upshift instruction primary rotational speed UD'–the upshift amount US) is set, and upshift to the pre-processing target primary rotational speed BTR for upshift is executed. By using the second-time kick-down upshift instruction primary rotational speed UD', the pre-processing target primary rotational speed BTR for upshift is high also in the third step ST3 for the second time. Accordingly, in the exemplary case illustrated in FIGS. 7A and 7B, the actual primary rotational speed PR at the end of the third step ST3 for the second time is substantially equal to the actual primary rotational speed PR at the end of the third step ST3 for the first time and is higher than the actual primary rotational speed PR obtained when second-time kick-down is determined.

In this case, acceleration in the second step ST2 for and after the second time is also sufficiently performed, and the primary rotational speed is high also in the third step ST3 after upshift has been executed. Accordingly, intended acceleration can be achieved, and the engine sound with the feeling of acceleration can be maintained.

Figure 8:
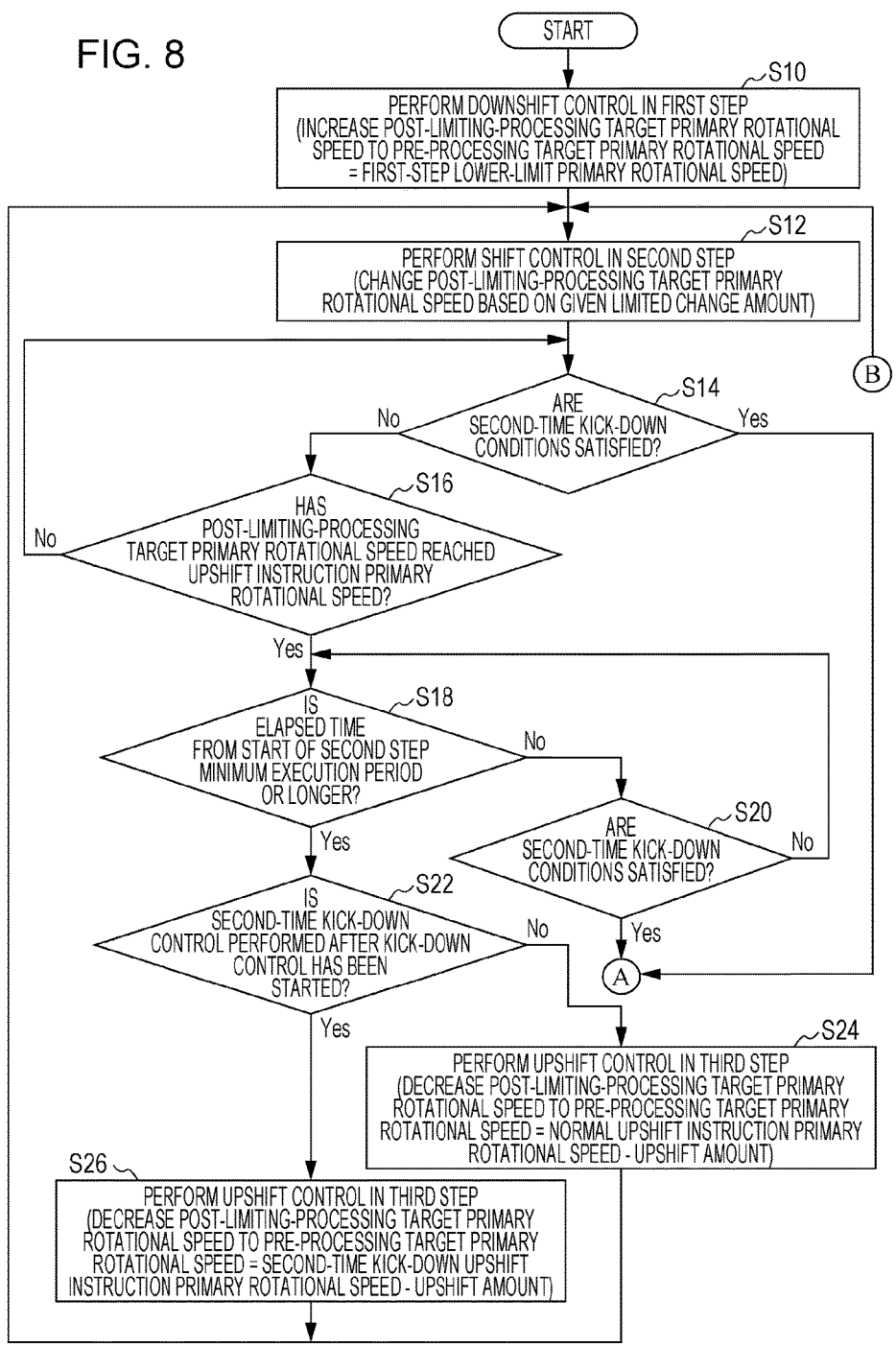
FIG. 8 is a flowchart illustrating the flow of kick-down control (when kick-down is performed) according to the example.

Now, the flow of kick-down control performed by the control device 1 (the TCU 10) corresponding to flowcharts in FIGS. 8 and 9 will be described with reference to FIG. 1. FIG. 8 is a flowchart illustrating the flow of kick-down control (when kick-down is performed) according to the example. FIG. 9 is a flowchart illustrating the flow of kick-down control (when second-time kick-down is performed) according to the example.

The TCU 10 determines whether kick-down conditions are satisfied. If the kick-down conditions are satisfied, kick-down control (kick-down mode) is started. First, the TCU 10 performs downshift control in the first step (S10). In this downshift control, the post-limiting-processing target primary rotational speed is increased to the first-step lower-limit primary rotational speed (=the pre-processing target primary rotational speed) that is determined in accordance with the vehicle velocity and the accelerator opening degree.

Then, the TCU 10 performs shift control in the second step (S12). In this shift control, the post-limiting-processing target primary rotational speed is changed on the basis of the given limited change amount that is determined on the basis of the vehicle velocity and the accelerator opening degree.

Then, the TCU 10 determines whether the second-time kick-down conditions are satisfied (S14). If it is determined in S14 that the second-time kick-down conditions are not satisfied, the TCU 10 determines whether the post-limiting-processing target primary rotational speed has reached the upshift instruction primary rotational speed (S16). If it is determined in S16 that the post-limiting-processing target primary rotational speed has not reached the upshift instruction primary rotational speed, the TCU 10 returns to the determination in S14. Note that if second-time kick-down control is not performed, the normal upshift instruction primary rotational speed determined by using the map for the normal upshift instruction primary rotational speed is used as the upshift instruction primary rotational speed in S16, whereas if second-time kick-down control is performed, a higher upshift instruction primary rotational speed, that is, the second-time kick-down upshift instruction primary rotational speed determined by using the map for the second-time kick-down upshift instruction primary rotational speed, is used as the upshift instruction primary rotational speed in S16.

If it is determined in S16 that the post-limiting-processing target primary rotational speed has reached the upshift instruction primary rotational speed, the TCU 10 determines whether the time elapsed from the start of the second step is the minimum execution period or longer (S18). If it is determined in S18 that the elapsed time is shorter than the minimum execution period, the TCU 10 determines whether the second-time kick-down conditions are satisfied (S20). If it is determined in S20 that the second-time kick-down conditions are not satisfied, the TCU 10 returns to the determination in S18.

If it is determined in S18 that the elapsed time is the minimum execution period or longer, shift control in the second step is completed, and the TCU 10 determines whether second-time kick-down control is performed after kick-down control (kick-down mode) has been started (S22).

If it is determined in S22 that second-time kick-down control is not performed, the TCU 10 performs upshift control in the third step (S24). In this upshift control, the upshift amount is determined, and the post-limiting-processing target primary rotational speed is decreased to the pre-processing target primary rotational speed that is obtained by subtracting the upshift amount from the normal upshift instruction primary rotational speed.

If it is determined in S22 that second-time kick-down control is performed, the TCU 10 performs upshift control in the third step (S26). In this upshift control, the upshift amount is determined, and the post-limiting-processing target primary rotational speed is decreased to the pre-processing target primary rotational speed that is obtained by subtracting the upshift amount from the second-time kick-down upshift instruction primary rotational speed.

If it is determined in S14 or S20 that the second-time kick-down conditions are satisfied, shift control in the second step is completed, and the TCU 10 performs downshift control in the second-time kick-down first step (S28). In this downshift control, the second-time kick-down downshift amount is determined in accordance with the accelerator opening degree and the engine rotational speed, and the post-limiting-processing target primary rotational speed is increased to the pre-processing target primary rotational speed that is obtained by adding the second-time kick-down downshift amount to the post-limiting-processing target primary rotational speed obtained when second-time kick-down is determined.

Then, the TCU 10 performs shift control in the second step (S30) as in S12. Then, the TCU 10 determines whether the second-time kick-down conditions are satisfied (S32) as in S14. If it is determined in S32 that the second-time kick-down conditions are not satisfied, the TCU 10 determines a higher upshift instruction primary rotational speed, which is the second-time kick-down upshift instruction primary rotational speed, in accordance with the vehicle velocity and the accelerator opening degree by referring to the map for the second-time kick-down upshift instruction primary rotational speed and determines whether the post-limiting-processing target primary rotational speed has reached the second-time kick-down upshift instruction primary rotational speed (S34). If it is determined in S34 that the post-limiting-processing target primary rotational speed has not reached the second-time kick-down upshift instruction primary rotational speed, the TCU 10 returns to the determination in S32.

If it is determined in S34 that the post-limiting-processing target primary rotational speed has reached the second-time kick-down upshift instruction primary rotational speed, the TCU 10 determines whether the time elapsed from the start of the second step is the minimum execution period or longer (S36) as in S18. If it is determined in S36 that the elapsed time is shorter than the minimum execution period, the TCU 10 determines whether the second-time kick-down conditions are satisfied (S38) as in S20. If it is determined in S38 that the second-time kick-down conditions are not satisfied, the TCU 10 returns to the determination in S36.

If it is determined in S32 or S38 that the second-time kick-down conditions are satisfied, shift control in the second step is completed, and the TCU 10 performs downshift control in the second-time kick-down first step (S28).

If it is determined in S36 that the elapsed time is the minimum execution period or longer, shift control in the second step is completed, and the TCU 10 performs upshift control in the third step (S40). In this upshift control, the upshift amount is determined, and the post-limiting-processing target primary rotational speed is decreased to the pre-processing target primary rotational speed that is obtained by subtracting the upshift amount from the second-time kick-down upshift instruction primary rotational speed.

If upshift control in the third step in S24, S26, or S40 is completed, the TCU 10 transitions to shift control in the second step in S12. The TCU 10 repeatedly performs the above process until the conditions for completing kick-down control are satisfied.

In the control device 1 according to the example, the second-time kick-down upshift instruction primary rotational speed (the upshift conditions) that is higher than the normal upshift instruction primary rotational speed is set after second-time kick-down has been performed, and it is determined whether the second step is to be ended (whether the third step (upshift) is to be started) by using the second-time kick-down upshift instruction primary rotational speed. Accordingly, the second-step execution period after second-time kick-down has been performed can be increased, and the process can be prevented from transitioning to upshift immediately after downshift caused by second-time kick-down has been executed. As a result, acceleration failure can be suppressed, and the engine sound with the feeling of acceleration can be maintained. Accordingly, in the control device 1 according to the example, even if second-time kick-down control and multistage-like kick-down control are performed during kick-down control, it is possible to realize acceleration intended by the driver and to improve the feeling of acceleration. Note that by incorporating the control device 1 according to the example in a vehicle, even a vehicle employing multistage-like kick-down control can perform second-time kick-down control.

In addition, in the control device 1 according to the example, after second-time kick-down has been performed, by determining whether the second step is to be ended by using the second-time kick-down upshift instruction primary rotational speed until kick-down control is completed, the second step and third step for and after the second time after second-time kick-down has been performed can be appropriately executed, and the feeling of acceleration can be improved.

Furthermore, in the control device 1 according to the example, by using the maps for the normal and second-time kick-down upshift instruction primary rotational speeds using the vehicle velocity and the accelerator opening degree as parameters, appropriate primary rotational speeds can be set as the normal and second-time kick-down upshift instruction primary rotational speeds. Accordingly, by determining whether upshift is to be executed on the basis of the upshift conditions using the upshift instruction primary rotational speed, transition can occur at an appropriate timing from downshift to upshift (from the second step to the third step).

Although the example of the present invention has been described above, the present invention is not limited to the above example and can be modified in various manners. For example, although the CVT 3 of a chain type has been used in the above example, another CVT such as a belt-type CVT or a toroidal-type CVT can also be used.

Although kick-down control is performed in the first step, the second-time kick-down first step, the second step, and the third step in the above example, the kick-down control may be performed in a different manner as long as multistage-like kick-down control and second-time kick-down control can be performed during kick-down control.

Although the upshift instruction primary rotational speed is set by using the map for the upshift instruction primary rotational speed in the above example, the upshift instruction primary rotational speed may be set by another method in which, for example, the upshift instruction primary rotational speed is calculated according to a predetermined formula. In addition, although the upshift instruction primary rotational speed is set in accordance with the vehicle velocity and the accelerator opening degree in the above example, the upshift instruction primary rotational speed may be set by using other parameters.

Although the upshift conditions are set by using the primary rotational speed (comparison between the upshift instruction primary rotational speed and the post-limiting-processing target primary rotational speed) in the above example, the upshift conditions may be set by using other parameters such as the gear ratio (pulley ratio), the primary rotational speed, and the secondary rotational speed.

Although it is determined whether upshift is to be executed by using the second-time kick-down upshift conditions (the second-time kick-down upshift instruction primary rotational speed) until kick-down control is completed after second-time kick-down has been performed in the above example, it may be determined whether upshift for and after the second time after second-time kick-down has been performed is to be executed by using the normal upshift conditions (the normal upshift instruction primary rotational speed).

Note that if the second-step execution period becomes too long by increasing the upshift instruction primary rotational speed after second-time kick-down has been performed, the limited change amount by which the post-limiting-processing target primary rotational speed is changed may be made larger than the normal limited change amount.

The control device 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 1 including the second-time kick-down determining unit 14, the second-time kick-down first-step controller 16, the second-step controller 17, the third-step controller 18, and the second-time kick-down upshift conditions setting unit 19. Such a medium may take any forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A control device for a continuously variable transmission configured to perform kick-down control for executing downshift in which a gear ratio of the continuously variable transmission is changed if kick-down conditions are satisfied, the control device comprising:
an upshift determining unit configured to determine whether upshift conditions are satisfied during the kick-down control;
an upshift controller configured to set an upshift amount and to execute upshift by the upshift amount if the upshift determining unit determines that the upshift conditions are satisfied;
a second-time kick-down determining unit configured to determine whether second-time kick-down conditions are satisfied during the kick-down control;
a second-time kick-down controller configured to set a second-time kick-down downshift amount and to execute downshift by the second-time kick-down downshift amount if the second-time kick-down determining unit determines that the second-time kick-down conditions are satisfied; and
a second-time kick-down upshift conditions setting unit configured to set second-time kick-down upshift conditions for starting upshift from a gear ratio that is lower than a gear ratio for other upshift conditions that are used during the kick-down control if the second-time kick-down determining unit determines that the second-time kick-down conditions are satisfied,
wherein, if the second-time kick-down determining unit determines that the second-time kick-down conditions are satisfied, the upshift determining unit performs determination using the second-time kick-down upshift conditions set by the second-time kick-down upshift conditions setting unit instead of the other upshift conditions.

2. The control device for the continuously variable transmission according to claim 1,
wherein the other upshift conditions are such that a primary pulley rotational speed is higher than or equal to an upshift instruction primary pulley rotational speed, and
wherein the second-time kick-down upshift conditions are such that the primary pulley rotational speed is higher than or equal to a second-time kick-down upshift instruction primary pulley rotational speed that is higher than the upshift instruction primary pulley rotational speed.

3. The control device for the continuously variable transmission according to claim 2,
wherein the upshift instruction primary pulley rotational speed and the second-time kick-down upshift instruction primary pulley rotational speed are set in accordance with a vehicle velocity and an accelerator opening degree.

4. The control device for the continuously variable transmission according to claim 3,
wherein, if the second-time kick-down determining unit determines that the second-time kick-down conditions are satisfied, the upshift determining unit performs determination using the second-time kick-down upshift conditions until the kick-down control is completed.

5. The control device for the continuously variable transmission according to claim 2,
wherein, if the second-time kick-down determining unit determines that the second-time kick-down conditions are satisfied, the upshift determining unit performs determination using the second-time kick-down upshift conditions until the kick-down control is completed.

6. The control device for the continuously variable transmission according to claim 1,
wherein, if the second-time kick-down determining unit determines that the second-time kick-down conditions are satisfied, the upshift determining unit performs determination using the second-time kick-down upshift conditions until the kick-down control is completed.

7. A control device for a continuously variable transmission configured to perform kick-down control for executing downshift in which a gear ratio of the continuously variable transmission is changed if kick-down conditions are satisfied, the control device comprising:
  circuitry configured to
    determine whether upshift conditions are satisfied during the kick-down control;
    set an upshift amount and executes upshift by the upshift amount if it is determined that the upshift conditions are satisfied;
    determine whether second-time kick-down conditions are satisfied during the kick-down control;
    set a second-time kick-down downshift amount and executes downshift by the second-time kick-down downshift amount if it is determined that the second-time kick-down conditions are satisfied; and
    set second-time kick-down upshift conditions for starting upshift from a gear ratio that is lower than a gear ratio for other upshift conditions that are used during the kick-down control if it is determined that the second-time kick-down conditions are satisfied,
  wherein, if it is determined that the second-time kick-down conditions are satisfied, the determination as to whether the upshift conditions are satisfied during the kick-down control is performed using the second-time kick-down upshift conditions instead of the other upshift conditions.

8. A control device for a continuously variable transmission configured to perform kick-down control for executing downshift in which a gear ratio of the continuously variable transmission is changed if kick-down conditions are satisfied, the control device comprising:
  an upshift determining unit configured to determine whether upshift conditions are satisfied during the kick-down control;
  a second-time kick-down determining unit configured to determine whether second-time kick-down conditions are satisfied during the kick-down control;
  a second-time kick-down controller configured to set a second-time kick-down downshift amount and to execute downshift by the second-time kick-down downshift amount if the second-time kick-down determining unit determines that the second-time kick-down conditions are satisfied; and
  a second-time kick-down upshift conditions setting unit configured to set second-time kick-down upshift conditions for starting upshift from a gear ratio that is lower than a gear ratio for other upshift conditions that are used during the kick-down control if the second-time kick-down determining unit determines that the second-time kick-down conditions are satisfied,
  wherein, if the second-time kick-down determining unit determines that the second-time kick-down conditions are satisfied, the upshift determining unit performs determination using the second-time kick-down upshift conditions set by the second-time kick-down upshift conditions setting unit instead of the other upshift conditions.

9. The control device for the continuously variable transmission according to claim 8,
  wherein the other upshift conditions are such that a primary pulley rotational speed is higher than or equal to an upshift instruction primary pulley rotational speed, and
  wherein the second-time kick-down upshift conditions are such that the primary pulley rotational speed is higher than or equal to a second-time kick-down upshift instruction primary pulley rotational speed that is higher than the upshift instruction primary pulley rotational speed.

10. The control device for the continuously variable transmission according to claim 9,
  wherein the upshift instruction primary pulley rotational speed and the second-time kick-down upshift instruction primary pulley rotational speed are set in accordance with a vehicle velocity and an accelerator opening degree.

11. The control device for the continuously variable transmission according to claim 10,
  wherein, if the second-time kick-down determining unit determines that the second-time kick-down conditions are satisfied, the upshift determining unit performs determination using the second-time kick-down upshift conditions until the kick-down control is completed.

12. The control device for the continuously variable transmission according to claim 9,
  wherein, if the second-time kick-down determining unit determines that the second-time kick-down conditions are satisfied, the upshift determining unit performs determination using the second-time kick-down upshift conditions until the kick-down control is completed.

13. The control device for the continuously variable transmission according to claim 8,
  wherein, if the second-time kick-down determining unit determines that the second-time kick-down conditions are satisfied, the upshift determining unit performs determination using the second-time kick-down upshift conditions until the kick-down control is completed.

* * * * *